United States Patent [19]

Défago et al.

[11] 4,042,545

[45] Aug. 16, 1977

[54] NOVEL PRINTING INKS FOR SUBLIMATION TRANSFER PRINTING

[75] Inventors: Raymond Défago, Riehen; Arnulf Ruediger Läpple, Arlesheim; Carl Becker, Basel, all of Switzerland

[73] Assignee: Ciba-Geigy AG, Basel, Switzerland

[21] Appl. No.: 586,131

[22] Filed: June 11, 1975

[30] Foreign Application Priority Data

June 13, 1974 Switzerland .......................... 8083/74
Feb. 13, 1975 Switzerland .......................... 1789/75

[51] Int. Cl.² ...................... C09D 11/06; C09D 11/08; C09D 11/14; C09D 11/10
[52] U.S. Cl. ......................................... 260/13; 106/21; 106/22; 106/26; 106/30; 106/32; 260/14; 260/16; 260/17 R; 260/DIG. 38; 101/473
[58] Field of Search ........................ 106/14, 21, 23, 22, 106/26, 30, 32; 101/473; 260/DIG. 38, 13, 14, 16, 17 R

[56] References Cited

U.S. PATENT DOCUMENTS

| | | | |
|---|---|---|---|
| 3,854,969 | 12/1974 | Zwahlen ............................... | 106/26 |
| 3,891,581 | 6/1975 | Argenio .................................. | 106/26 |
| 3,907,567 | 9/1975 | Nihyakumen et al. ................ | 106/19 |
| 3,945,837 | 3/1976 | Miyata et al. ......................... | 106/22 |

*Primary Examiner*—Allan Lieberman
*Attorney, Agent, or Firm*—Wenderoth, Lind & Ponack

[57] ABSTRACT

Object of the present invention are novel printing inks with organic solvents for sublimation transfer printing which contain a high concentration of very finely dispersed, transferable cationic dyes, and specifically;

a. at least one cationic dye or a mixture of cationic dyes,
b. at least one soluble resin as stabilizer, film former and thickener,
c. a low-viscosity, low molecular organic solvent or solvent mixture in which the cationic dye or dyes are only slightly soluble at room temperature and the resin or resins are at least 5% soluble,
d. an inorganic or organic acid acceptor or mixtures thereof, and
e. at least one indicator dye which is inert to inorganic or organic acid acceptors.

9 Claims, No Drawings

NOVEL PRINTING INKS FOR SUBLIMATION TRANSFER PRINTING

The present invention provides novel printing inks with organic solvents for sublimation transfer printing which contain a high concentration of very finely dispersed, transferable cationic dyes.

Printing inks with disperse dyes on an organic basis are already known. For example, DOS 1.771.813 describes printing inks which contain (1) a disperse dye which sublimes at 160° to 220° C of a mixture of disperse dyes, (2) a soluble resin used as dye carrier, (3) an aqueous-organic or almost purely organic solvent or solvent mixture, and (4) a resin which is used as thickener or binder for the printing ink and which can be identical with the resin (2). It is possible to use virtually all organic solvents which possess the desired solubility or emulsifiability for the dyes and binders in question.

The ordinary commerically available cationic dyes for dyeing polyacrylonitrile fibres by conventional aqueous methods are used principally in the form of their salts with strong inorganic acids, for example as chlorides, bromides, methasulphates or zinc chloride double salts. The vapour pressures of these commercially available dye salts are very low at temperatures below 200° C at atmospheric pressure. Unless steam and moist textile material are used, they therefore produce only faint dyeings or none at all on polyacrylonitrile fibres in the transfer printing process at temperatures of 150° to 190° C. The proposal was therefore made in Belgian patent 808.059 to use carboxylic acid salts of cationic dyes for the transfer printing.

Swiss patent application 8083/74 describes suitable printing inks for transfer printing which contain at least one cationic dye in the form of the commercially available sublimable dye salt and, in addition to other components, an organic or inorganic base or mixtures thereof. Double reaction results in the direct formation in these printing inks of the corresponding colour bases which have principally another shade or are very largely colourless. The consequence of this is that a patterning of the carriers printed with these printing inks in the original shades is not possible. A patterning is made possible only by a subsequent transfer print on the textile material, in the course of which the original shade is reobtained, but this is expensive and time-consuming.

The invention is based on the observation that it is possible to avoid this drawback of the cited printing inks by adding to these at least one indicator dye which is inert to inorganic or organic bases, advantageously in amounts of 0.1 to 10 percent by weight, based on the cationic dye used.

The invention therefore provides printing inks for sublimation transfer printing which contain
  a. at least one cationic dye or a mixture of cationic dyes,
  b. at least one soluble resin which is used as stabiliser, film former and thickener,
  c. a low-viscosity, low molecular organic solvent or solvent mixture in which the cationic dye or dyes are only slightly soluble at room temperature and the resin or resins are at least up to 5% soluble,
  d. at least one inorganic or organic acid acceptor or mixtures thereof, and
  e. at least one indicator dye which is inert to inorganic or organic acid acceptors.

Suitable solvents which meet the cited requirements are the low molecular aliphatic hydrocarbons and chlorinated hydrocarbons with a boiling point between 80° and 180° C, the first members of the aliphatic alcohols and ether alcohols, as well as especially mixtures of these types of solvent. As far as possible they should contain no aromatic hydrocarbons and ketones. The mixtures in particular are very good solvents for the required resins, but are very poor ones for the cationic dyes and surprisingly yield extremely stable printing inks of low viscosity. The solubility of the cationic colour bases in the printing ink should not be more than 10 g/l and preferably should be less than 2 g/l. Suitable hydrocarbons with a boiling point between 80° and 180° C are straight-chain or branched products, as well as those which possess a cycloalkyl group. Examples are: 2,2- and 2,3-dimethyl butane, isohexane, 3-methyl- and 2,4-dimethyl pentane, n-heptane, n-octane, n-decane, n-undecane, cyclohexane, methyl cyclopentane, methyl cyclohexane, 1-isopropyl-4-methyl cyclohexane, hexane, and especially mixtures, such as petroleum fractions with boiling limits between 110° and 180° C.

Examples of suitable chlorinated hydrocarbons are trichloroethylene, methyl chloroform, perchloroethylene and carbon tetrachloride.

Examples of alcohols are methanol, ethanol, propanol, isopropanol, isobutanol and tert. butanol, and examples of ether alcohols are monomethyl glycol and monoethyl glycol.

Mixtures of isopropanol with methanol, ethanol or n-propanol or with one of the cited liquid aliphatic hydrocarbons or hydrocarbon mixtures whose boiling point is between 80° and 180° C, preferably 110° and 140° C, are particularly suitable.

Inorganic acid acceptors are in this context primarily the hydroxides, oxides, carbonates and alcoholates of alkali metals and alkaline earth metals, for example sodium or potassium hydroxide, sodium carbonate or bicarbonate, the oxides and hydroxides of magnesium and calcium, sodium or potassium methylate, and organic acid acceptors are in particular amines, hydroxyamines, tetraalkylammonium hydroxides and alkanolamines, for example dimethyl hydroxyamine, tetramethylammonium hydroxide and triethanolamine. It is advantageous if these compounds are present in the solvent in dissolved form.

The desired basicity of the printing inks is adjusted by using appropriately an amount of acid acceptor which is necessary for a complete reaction of the cationic dye used for the manufacture of the ink from its salt form. A surplus is normally not disadvantageous. The pH of the printing ink is adjusted with advantage to at least 7.5. It is expedient to use only so much inorganic or organic acid acceptor that no reverse transformation reaction into the salt form of the cationic dyes is possible.

Suitble dyes are the ordinary commercially availble cationic dyes which are principally in the form of their salts with strong acids, e.g. chlorides, bromides, methasulphates or zinc chloride double salts.

The cationic dyes used according to the invention are for the most part chromophoric systems the cationic character of which is derived from a carbonium, ammonium, oxonium or sulphonium group. Examples of such chromophoric systems are: methine, hydrazone, enamine, azine, oxazine, thiazine, diazine, xanthene, caridine, polyarylmethane, such as diphenylmethane or triphenylmethane, and cumarin dyes, also arylazo, naphtholactam and anthraquinone dyes with external ammonium group. By cationic dyes are also meant cationic fluorescent brighteners, above all those of the methine, azomethine, benzimidazole, cumarin, naphthalimide or pyrazolone class.

With the exception of the cationic dyes, the indicator dyes to be used according to the invention can belong to the most widely differing classes, provided they are inert only to inorganic or organic compounds with basic reaction and do not adversely affect the properties of the material to be printed. For example, they can be disperse dyes, pigment dyes, acid dyes, vat dyes or reactive dyes.

As indicator dyes or dyestuff mixtures defined herein there are used with advantage those which have the same shade as that of the cationic dyes and do not themselves transfer into the textile material. The indicator dye is used desirably in amounts of 0.1 to 10, advantageously 0.5 to 1.5, percent by weight, based on the amount of the cationic dye in the printing ink.

The cationic dyes, as well as the cationic colour bases which are formed according to the invention in situ in the printing ink, are almost insoluble in the defined solvents and solvent mixtures, i.e. at room temperature they have a solubility of preferably not more than 0.5%, whereas the dyestuff concentration in the ink is normally 20 to 100 times greater. They are consequently in the form of a fine dispersion with a particle size which should preferably be less than $10\mu$.

The soluble resins, or the mixtures thereof, which must be present in the printing ink in dissolved form, have a number of different functions to fulfil. They must stabilise the dyestuff dispersion so that no sedimentation or creaming occurs; they must ensure the reversibility of the dispersion in case small amounts of printing ink dry out and fall back into the ink; they must give the colour sufficient body and ensure a good film quality without increasing the viscosity above the level still permissible for printing; they must rapidly release the solvent and may not become tacky; they may retain the dye during transfer and must withstand the requisite temperatures of up to 230° C without undergoing modification or decomposition. In order to meet all these requirements and still be able to accommodate large amounts of dye in the printing ink, it is expedient to use a combination of different resins which are complementary or cumulative in their properties. In this connection, the cellulose alkyl ethers or esters have an especially important function as stabilisers for the dyestuff suspension.

Ethyl and propyl cellulose are particularly suitable in addition to phenyl cellulose, allyl cellulose, cyanoethyl cellulose, ethylhydroxyethyl cellulose. Among the esters, mention is to be made in particular of the alcohol-soluble mixed esters, e.g. cellulose acetobutyrate or cellulose acetopropionate. The low-viscosity, readily soluble products of not too high molecular weight have a particularly interesting utility.

It is advantageous if the amount of ethyl cellulose is kept as low as possible so as not to increase the viscosity too greatly. Preferably a resin is used to give the printing ink the required amount of solid, the "body". This must also dissolve readily and leave no residue in the combination, rapidly release the solvent, and not become tacky on drying. Resins which fulfil these conditions and also possess the heat stability necessary for the transfer procedure are found in the class of the colophonium derivatives, especially the esters of hydrogenated or polymerised colophonium which can be modified with phenols and resin formers. The alkyd resins, maleic resins, polyterpenes, polyvinyl acetals, alkylated polyolefins, substituted rubber, e.g. chlorinated rubber and cyclorubber, and the ketone resins are also to be mentioned. It can be easily ascertained by means of preliminary tests whether the viscosity and solubility satisfy the requirements and also whether the solvent mixture is released rapidly enough.

Compared with the printing inks of the prior art, the transfer printing inks of the present invention have the great advantage that they permit the manufacture of concentrated preparations of high dye content, e.g. with 10 to 15% of pure dye, as is required for application in flexographic printing and for transfer printing on carpets. They therefore constitute a useful addition to the state of the art.

The printing inks can be manufactured by methods which are known per se, for example by diluting, with stirring, the finely dispersed dyestuff preparations which correspond to the composition as described hereinbefore. If the printing inks according to the invention contain solids, then it is desirable to comminute these by grinding or other physical operations to a particle size smaller than $20\mu$, advantageously smaller than $10\mu$. The viscosity which is necessary for printing is attained by adding soluble binders, such as cellulose derivatives or other film formers customarily used in the printing industry.

Printing inks which contain at least 10% of dye and at least 5% of soluble resin advantageously have a viscosity of at most 30 seconds, measured in a No. 4 Ford cup.

The carriers required for the transfer printing can be any kind of preferably non-textile structures, preferably flat surface structures based on cellulose, which can be printed with the printing inks according to the invention. Principally acid-free paper is used as carrier, or metal foils, preferably in the form of an endless band, and the like. The printing inks according to the invention, if appropriate after diluting them, are applied to the carriers in known manner.

Examples of organic materials which can be dyed with cationic dyestuffs, and which can be dyed and/or treated with fluorescent brighteners using the printing inks according to the present invention, are: tannin-treated cotton, leather, wool, polyamides, such as polyhexamethylenediamine adipate, poly-$\epsilon$-caprolactam or poly-$\omega$-aminoundecanoic acid, polyesters, such as polyethylene glycol terephthalate or polycyclohexanedimethylene terephthalate, but above all acid-modified synthetic fibres, especially acid-modified polyamides, e.g. polycondensation products of 4,4'-diamino-2,2'-diphenyldisulphonic acid or 4,4'-diamino-2,2'-diphenylalkanedisulphonic acids with polamide forming starting materials, polycondensation products of monoaminocarboxylic acids or their amide forming derivatives or of dibasic carboxylic acids and diamines with aromatic dicarboxysulphonic acids, e.g. polycondensation products of $\epsilon$-caprolactam or hexamethylenediammonium adipate with potassium-3,5-dicarboxybenzenesulphonate, or acid-modified polyester fibres, for example terephthalic or isophthalic acid, polyhydric alcohols, e.g. ethylene glycol, and 1,2- or 1,3-dihydroxy-3-(3-sodium sulphopropoxy)-propane, 2,3-dimethylol-1-(3-sodium sulphopropoxy)-butane, 2,2-bis-(3-sodium sulphopropoxyphenyl)-propane or 3,5-dicarboxybenzenesulphonic acid or sulphonated terephthalic acid, sulphonated 4-methoxy-benzenecarboxylic acid or sulphonated diphenyl-4,4'-dicarboxylic acid.

However, polyacrylonitrile fibres (containing at least 85% acrylonitrile) and modacryl fibres are preferred. In the polymerisation of acrylonitrile and comonomers, persulphate radicals (deriving from the usual catalyst systems) consisting of potassium persulphate, potassium metasulphite and ferriammonium sulphate, are built into the chain ends as regulators. In addition to acrylonitrile, other vinyl compounds are normally used as comonomers, e.g. vinylidene chloride, vinylidene cyanide, vinyl chloride, methacrylic amide, vinyl pyridine, methylvinyl, pyridine, N-vinylpyrrolidone, vinyl acetate, vinyl alcohol, methylmethacrylate, styrenesulphonic acid or vinylsulphonic acid.

Provided the devices suitable for the purpose are available, the fibre material can be dyed or treated with fluorescent brighteners according to the invention in any desired form, for example in the form of flocks, slubbing, yarn, texturised fibres, woven fabrics, knitted fabrics, non-wovens from fibres, ribbons, webs, textile floor coverings, such as woven needle felt carpets or hanks of yarn which can be in the form of webs or are cut or ready finished, but also in the form of sheets. The fibre material can also be in the form of fibre blends or blended fabrics.

The transfer is effected also in known manner by applying heat, optionally under vacuum, at temperatures between 100° and 210° C, preferably at 150° to 190° C, and contact times of 5 to 120 seconds. There is used for this purpose e.g. a tunnel equipped with infrared heaters, a heating drum or ironing press.

Compared with a transfer print using ordinary commercially available cationic dyes, appreciably better and stronger dyeings and prints are obtained so that the transfer times and temperatures can be reduced. This is particularly important when printing polyacrylonitrile fibres, since otherwise they turn yellow and are given a hard, undesirable handle.

The following Examples illustrate the invention, the parts and percentages being by weight unless otherwise stated.

EXAMPLE 1

12 g of the blue cationic dye (in ordinary commercial form) of the formula

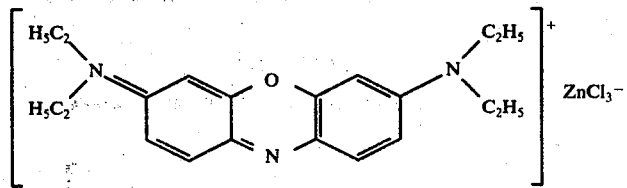

0.18 g of the blue disperse dye of the formula

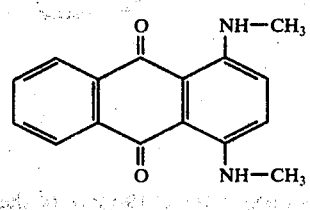

and 4 g of ethyl cellulose are made into a paste with 30 ml of methyl alcohol and this paste is diluted, with stirring, with 30 ml of isopropanol. Then 20% sodium methylate solution in methanol is added until the pH is 8. The preparation is then treated in a ball mill until there are no particles present with a granular size larger than 10μ. A ready for use blue printing ink which is highly suitable for intaglio printing is thus obtained direct.

This blue printing ink is applied to the entire surface of a strip of paper by spraying, printing or coating it. A polyacrylonitrile fabric (ORLON type 44) is then laid on the treated carrier. Using a heating plate, carrier and fabric are subsequently brought into contact for 60 seconds at 190° C. A second, unheated plate ensures uniform contact. The coloured fabric is then removed from the carrier. A polyacrylonitrile fabric which is dyed a strong blue shade of excellent wet fastness and good light fastness is obtained in this way.

Similarly good printing inks are obtained by carrying out the procedure of this Example but using corresponding amounts of ethanol, n-propanol or n-hexane instead of methanol.

EXAMPLE 2

12 g of the orange cationic dye (in ordinary commercial form) of the formula

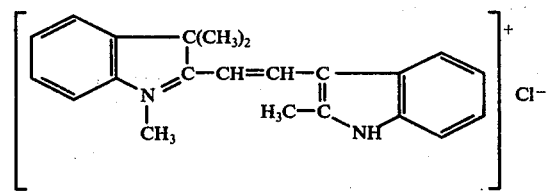

0.18 g of the orange dye of the formula

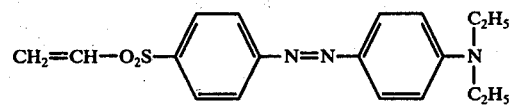

and 4 g of ethyl cellulose are ground with 30 ml of ethanol and 20 ml of triethanolamine in a ball mill to a particle fineness of less than 10μ. During the grinding process the pH of the preparation is adjusted to a pH of 9 by addition of further dye or triethanolamine.

A homogeneous orange coloured printing ink of the desired viscosity may also be obtained by dilution with ethanol.

EXAMPLE 3

12 g of the blue cationic dye (in ordinary commercial form) of the formula 0.18 g of the blue dye of the formula

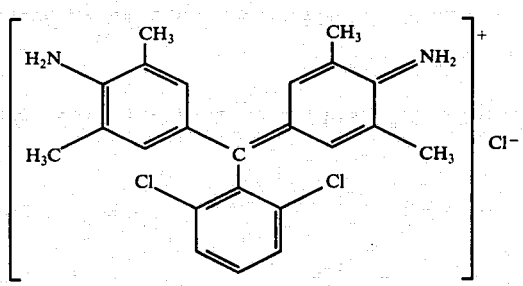

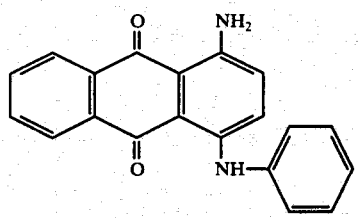

4 g of ethyl cellulose, 26 ml of methanol and 10 g of tetramethylammonium hydroxide are homogenised in a ball mill. The resultant blue printing ink has a viscosity of 28 seconds (Ford cup No. 4) and is very stable. The printing ink has a pH of 8.

EXAMPLE 4

12 g of the green cationic dye of the formula

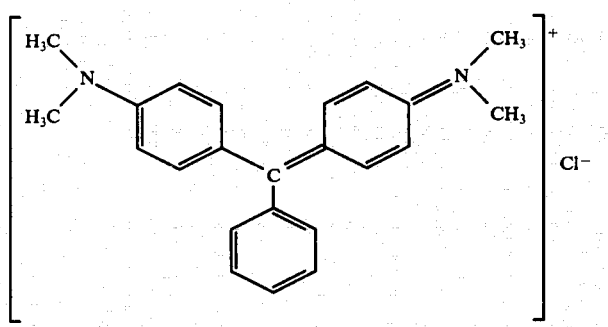

0.1 g of the yellow dye of the formula

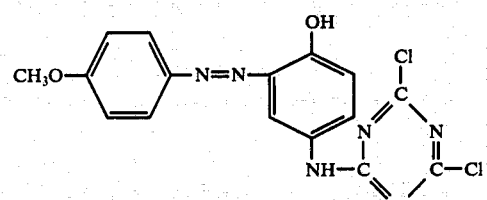

0.1 g of the blue dye of the formula

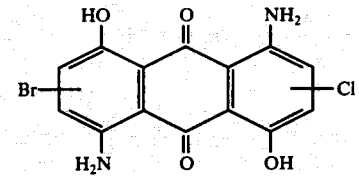

5 g ot ethyl cellulose (Ethocel E 7, Dow Chem.), and 1 g of NaOH are ground for 4 hours in 50 g of perchloroethylene. During the grinding process, the pH is adjusted to 8.5 by addition of further NaOH or dye. The resultant suspension is diluted to 300 ml with perchloroethylene and applied to a cellulose parchment paper by coating and subsequently dried. A polyacrylonitrile knitted fabric is laid on the treated carrier and carrier and goods are heated for 30 seconds to 180° C while being kept in close contact. The coloured fabric is then separated from the carrier. The polyacrylonitrile knitted fabric is dyed a green shade of good wet fastness properties.

EXAMPLE 5

150 g of the yellow cationic dye of the formula 1 to 2 g of the yellow dye of the dye of the formula

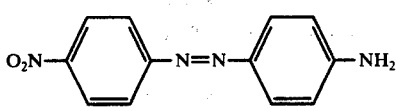

350 g of isopropanol and 3 g of ethyl cellulose are ground with 2000 g of glass beads until the particle size is between 1 and 3μ. During the grinding process, the pH is adjusted to 8.5 with potassium hydroxide. The resultant dispersion is separated from the glass beads and divided into 5 portions of 100 g each. Into each of these portions are stirred 10 g of one of the follow-synthetic resins: ALRESANT KM 44 (colophonium/maleic resin), ALFTALAT AN 420 (non-drying alkyd resin), PENTALYL 830 (pentaerythritol resin of Hercules Comp., USA), ketone resin N (BASF) and/or half the amount of Mowital B 30 H (polyvinyl acetal resin, Hoechst).

All the printing inks have viscosities lower than 30 seconds and give strong yellow prints on paper which do not rub off and which can be transferred readily.

EXAMPLE 6

10 g of the blue cationic dye of the formula

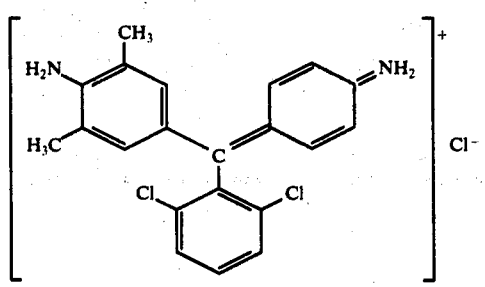

0.3 g of the blue dye of the formula

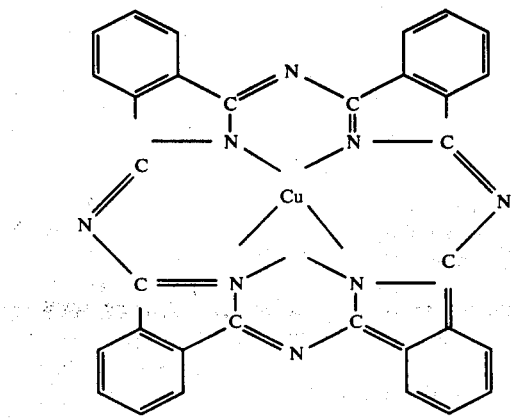

3.5 g of ethyl cellulose and 0.7 g of sodium hydroxide are ground in 30 ml of ethanol in a ball mill to a particle fineness smaller than 10μ. The resultant blue printing ink is storable.

In the intaglio printing process, very strong unicolour as well as multicolour prints are obtained with the printing inks of Examples 1 to 6 on carrier papers which yield very strong, sharply contoured unicolour and multicolour prints by transfer to polyacrylonitrile fabrics as described in the preceding Examples.

EXAMPLE 7

5 g of the red dye of the formula

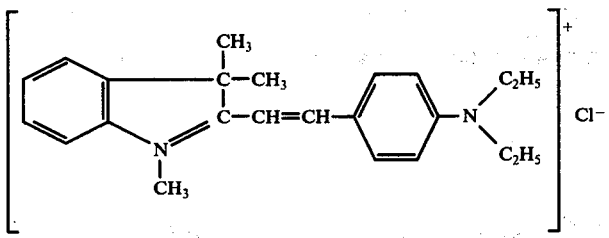

are added, with vigorous stirring, to 20 ml of a 7% ethyl cellulose solution in ethanol. While stirring, the pH of the preparation is adjusted to a pH of 9 by addition of a 10% potassium hydroxide solution in ethanol. The red printing ink becomes virtually colourless after a few minutes.

Addition of 0.5 g of a preparation consisting of 75% of the red dye of the formula

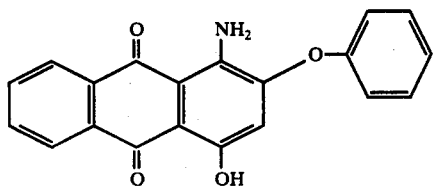

and 25% ethyl cellulose yields a coloured printing ink which is highly suitable for intaglio printing.

EXAMPLE 8

With stirring, 3 g of the red dye (in salt form) of the formula 2 g of the yellow dye (in salt form) of the formula

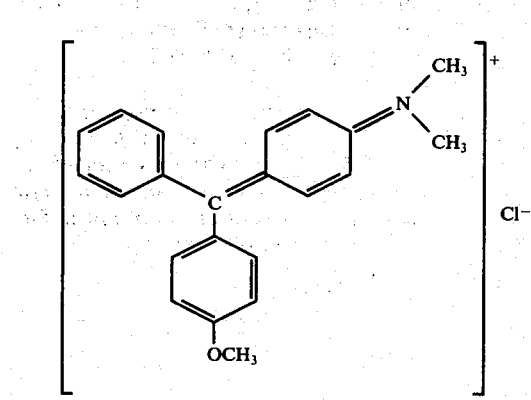

0.3 g of the red dye of the formula

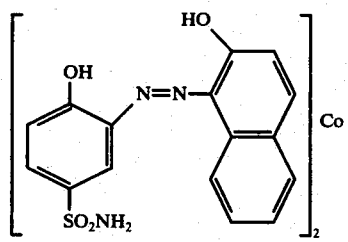

and 0.2 g of the yellow dye of the formula

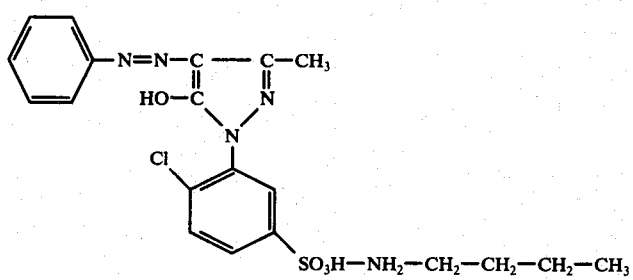

are dispersed in a ball mill in a solution of 3 g of sodium methylate in 90 g of ethanol, thickened with 7 g of ethyl cellulose.

The resultant red ink is printed on transfer paper to yield a carrier paper suitable for the transfer printing process.

EXAMPLE 9

50 parts of the dye of the formula

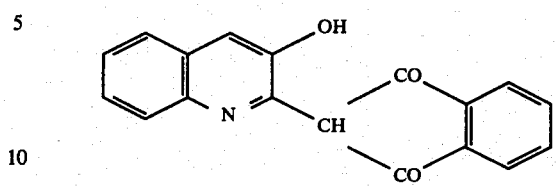

200 parts of isopropanol and 1 part of ethyl cellulose are ground with 300 parts of glass beads until the particle size is about 1 to 3μ. The resultant dispersion is separated from the glass beads and divided into 10 portions.

The first 25 portions are further ground with 12 parts of Pentalyn 830 (pentaerythritol synthetic resin of Hercules Comp., USA), 100 parts of isopropanol, 20 parts of the dye of the formula

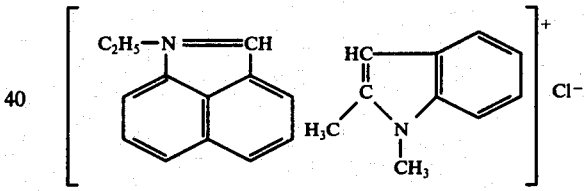

and 4 parts of tetramethylammonium hydroxide to a particle size smaller than 3μ. The pH is adjusted to 3 during the grinding process. The resultant printing ink has a viscosity of 30 seconds in a Ford cup No. 4.

A further 25 portions of the above dispersion are each ground with 12 parts of AFS resin (ketone resin of cyclohexanone and formuldehyde of Bayer, Germany), 100 parts of isopropanol and 20 parts of one of the following dyes of the formulae

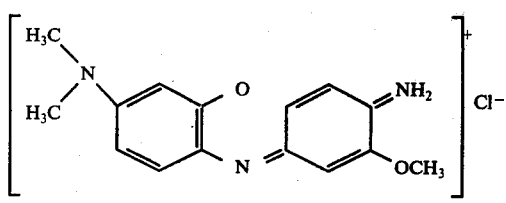

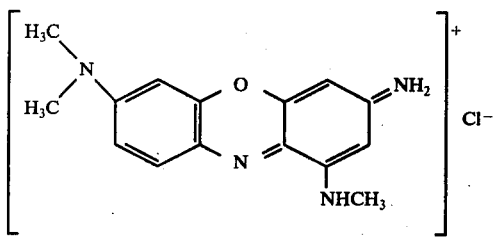

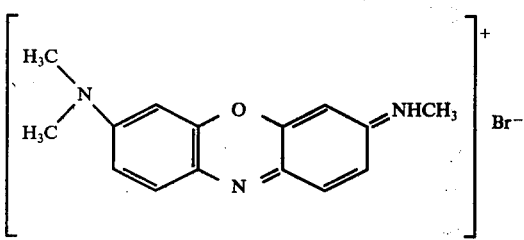

and 4 parts of tetraethylammonium hydroxide to a particle size smaller than 3μ. During the grinding process, the pH is adjusted to 8.5 with trimethylammonium hydroxide. The resultant printing inks have a viscosity of 28 seconds in a Ford cup No. 4.

The last six 25 parts of the dispersion are each ground with 12 parts of alcohol-soluble cellulose acetopropionate, 100 parts of isopropanol, 10 parts of one of the following dyes of the formulae

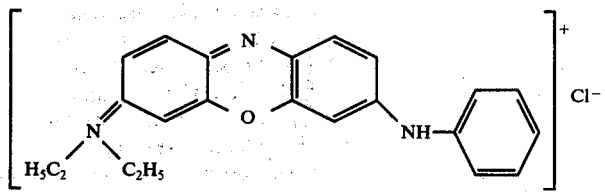

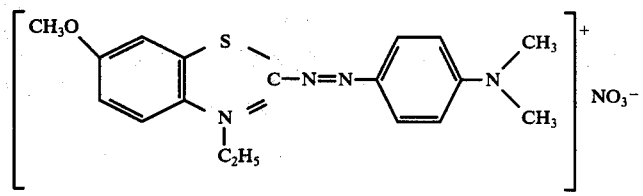

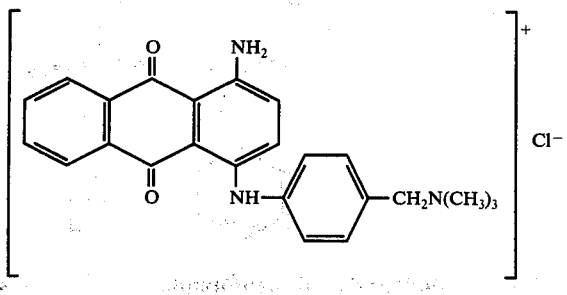

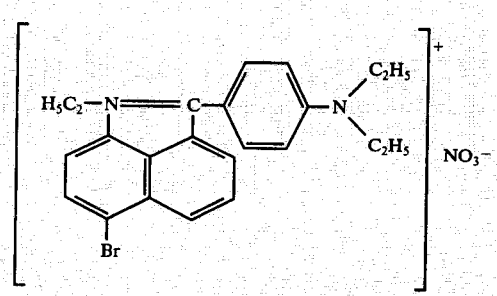

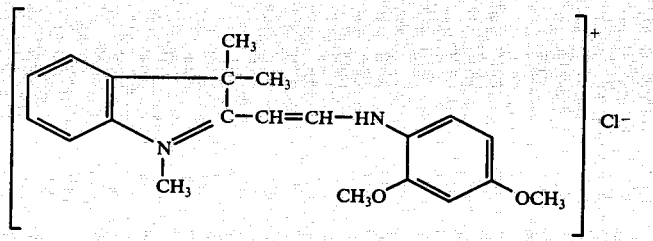

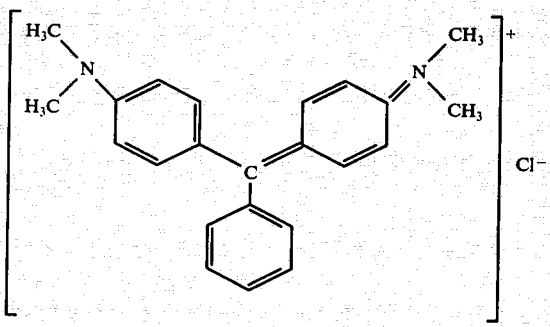

and 4 parts of tetraethylammonium hydroxide to a particle size smaller than 3μ. The resultant printing inks have a viscosity of 26 seconds.

In the intaglio printing process, these printing inks give very strong prints on carrier papers which produce very strong prints by transfer to polyacrylic fabrics as described in the preceding Examples. It is possible to transfer the dyes three times in succession with the same paper in approximately the same colour strength. However, if desired, the inks can be diluted with isopropanol to such a colour strength that a maximum dye yield is obtained when transferring the dyes to the fabric.

EXAMPLE 10

5 parts of a preparation consisting of 3.75 parts of the fluorescent brightener of the formula

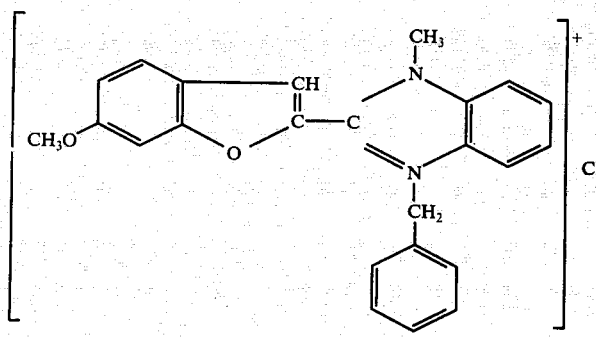

0.05 g of the blue indicator dye of the formula

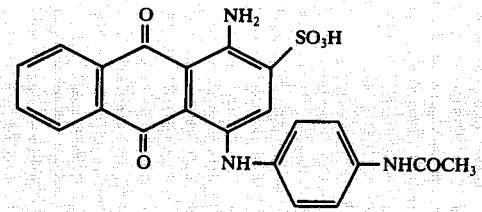

and 1.25 parts of ethyl cellulose are ground in 22 parts of isopropanol, 22 parts of ethanol, 44 parts of white spirit (boiling limit 120°–180° C) and 7 parts of ethyl cellulose (to stabilise the printing ink) in a ball mill until the preparation is completely deaggregated. During the grinding, the pH is adjusted to 8.5 with addition of sodium methylate.

The resultant printing ink has very good stability.

We claim:

1. Printing inks for sublimation transfer printing which contain
   a. at least one sublimable cationic dye or a mixture of cationic dyes the cationic character of which is derived from a carbonium, ammonium, oxonium or sulphonium group, the solubility of the cationic dyes in the printing ink being not more than 10g/l and said cationic dyes being present in the form of a fine dispersion;
   b. a soluble resin component which comprises at least one soluble resin said component functioning as stabilizer, film former and thickener, which component stabilizes the dyestuff dispersion so that no sedimentation or creaming occurs, ensures the reversibility of the dispersion in case small amounts of printing ink dry out and fall back into the ink, gives the colour sufficient body and ensures a good film quality without increasing the viscosity above the level still permissible for printing, rapidly releases the solvent and does not become tacky, does not retain the dye during transfer and withstands the requisite transfer printing temperatures of up to 230° C without undergoing modification or decomposition;
   c. a low viscosity, low molecular organic solvent or solvent mixture in which the cationic dye or dyes are only slightly soluble at room temperature and the resin component is at least 5% soluble selected from the group of low molecular aliphatic hydrocarbons and chlorinated hydrocarbons with a boiling point between 80° and 180° C, the first members of the aliphatic alcohols and ether alcohols, and mixtures of these types of solvent;
   d. at least one inorganic acid acceptor selected from the group of hydroxides, oxides, carbonates and alcoholates of alkali metals and alkaline earth metals, or organic acid acceptor selected from the group of amines and tetraalkylammonium hydroxides; and
   e. about 0.1 to 10 percent by weight, based on the cationic dye of at least one indicator dye or dyestuff mixture which is inert to inorganic or organic acid acceptors, which has the same shade as that of the cationic dyes and which does not itself transfer into the textile material.

2. A printing ink according to claim 1, wherein there is used s indicator dye a disperse dye, a pigment dye, an acid dye, a vat dye, a reactive dye or mixtures thereof.

3. A printing ink according to claim 1, wherein the indicator dye is used in amounts of 0.5 to 1.5 percent by weight, based on the cationic dye.

4. A printing ink according to claim 1 which has a viscosity of at most 30 seconds, measured in a Ford cup 4, when containing at least 10% of dye and at least 5% of synthetic resin.

5. A printing ink according to claim 1 which contains
   a. as soluble resin used as film former, stabiliser and thickener: cellulose alkyl ethers or cellulose alkyl esters the alkyl group of which contains 2 to 4 carbon atoms and the ester group is an alkanoyl group containing 2 to 4 carbon atoms, and a soluble resin from the group of colophonium resins, maleic resins, alkyd resins, ketone resins, polyterpenes, rubber derivatives or modified phenol resins, and
   b. as solvent: a mixture of isopropanol with methanol, ethanol or n-propanol or with a liquid aliphatic hydrocarbon or hydrocarbon mixture, the boiling point of which is between 80° and 180° C, preferably 110° and 140° C.

6. A printing ink according to claim 1 which contains ethyl cellulose as soluble resin.

7. A printing ink according to claim 1 which contains as inorganic acid acceptors alkali and alkaline earth hydroxides, carbonates or alcoholates, and as organic acid acceptors amines selected from the group of hydroxyamines and alkanolamines.

8. A printing ink according to claim 1 which has a pH of at least 7.5.

9. A printing ink according to claim 1, wherein the dye particles are smaller than 10μ.

* * * * *